United States Patent [19]

Gardner et al.

[11] Patent Number: 4,988,523

[45] Date of Patent: Jan. 29, 1991

[54] METHOD AND COMPOSITION FOR PRESERVING FRESH PEELED FRUITS AND VEGETABLES

[75] Inventors: James Gardner; Shambhu Manohar, both of Amsterdam; Walter S. Borisenok, Albany, all of N.Y.

[73] Assignee: Liberty Enterprises, Inc., Amsterdam, N.Y.

[21] Appl. No.: 496,677

[22] Filed: Mar. 21, 1990

Related U.S. Application Data

[63] Continuation-in-part of Ser. No. 37,990, Apr. 14, 1987.

[51] Int. Cl.⁵ .............................................. A23B 7/10
[52] U.S. Cl. ................................. 426/268; 426/270; 426/310; 426/335; 426/532
[58] Field of Search ............... 426/615, 270, 262, 321, 426/335, 323, 310, 331, 532, 418, 419, 268, 316, 326, 541

[56] References Cited

U.S. PATENT DOCUMENTS

| | | | |
|---|---|---|---|
| 1,774,310 | 8/1930 | Bates | 426/615 |
| 2,593,223 | 4/1952 | Trelease | 426/321 |
| 3,065,081 | 11/1962 | Leo | 426/615 |
| 3,305,366 | 2/1967 | Sutton | 426/615 |
| 3,852,489 | 12/1974 | Yip | 426/268 |
| 3,892,875 | 7/1975 | Sfeir | 426/310 |
| 3,978,235 | 8/1976 | Schero | 426/335 |
| 3,987,208 | 10/1976 | Rahman | 426/335 |
| 4,011,348 | 3/1977 | Farrier | 426/615 |
| 4,647,458 | 3/1987 | Ueno | |

OTHER PUBLICATIONS

Sporix product description TR1-K Industries, Westwood, N.J.
The American Heritage Dictionary, 2nd Edition, 1982, p. 1350, Houghton Mufflin Co.
Websters Ninth New Collegiate Dictionary, 1986, p. 1544, Merriam-Webster Inc.

*Primary Examiner*—Carolyn Paden
*Attorney, Agent, or Firm*—Schmeiser, Morelle & Watts

[57] ABSTRACT

A process and sulfite-free solution for use in preserving fresh-peeled vegetable and fruits, as well as fresh leafy vegetables. Fresh peeled potatoes, other peeled vegetables and fresh peeled fruits are preserved by a first dipping process or spraying employing a mixture of the commerical preservative SPORIX (tm) and citric acid. After trimming, the peeled vegetables are subjected to a second exposure to the same solution; and thereafter, the peeled vegetables are packaged and refrigerated for up to 12 days without suffering discoloration or putrificatiohn. Leafy vegetables, after a similar but shorter treatment, are storable for up to 9 days before consumption.

10 Claims, No Drawings

METHOD AND COMPOSITION FOR PRESERVING FRESH PEELED FRUITS AND VEGETABLES

This is a Continuation In Part of U.S. application Ser. No.: 037,990, Filed Apr. 14, 1987 of the same title and by the original applicants.

FIELD OF THE INVENTION

The present invention relates generally to the preservation of fresh fruits, leafy vegetables and fresh, whole peeled potatoes. It relates in particular to certain new and useful discoveries regarding the formulation of a treating solution to inhibit oxidation and enzymatic browning of the vegetables, especially fresh peeled potatoes, as well as a method for its application thereto.

BACKGROUND AND OBJECTS OF THE INVENTION

During fresh vegetable and fruit processing, the processor must contend with three natural problems: discoloration which destroys a esthetic appeal (notably, lettuce wilting; fruits and potatoes browning); oxidation, which has an effect on taste; and microbiological growth, which can result in the aforementioned effects as well as the production of toxins. Once the peel or outer layer has been removed from a fruit or vegetable, all of the aforementioned problems begin to occur. To illustrate, it can be readily observed that fresh peeled potatoes will begin to brown (discolor) within ten minutes after the removal of the skin. Thus, for all practical commercial purposes, the shelf life of fresh peeled potatoes is less than ten minutes.

For the past 100 years, it is been common to employ sulfiting agents such as sodium bisulfite to retard the enzymatic and oxidizing processes. Control over microorganisms and microbiological growth has been attained through the use of other preservatives or refrigeration, radiation, and other methods directed toward antibiosis.

Relative to the prevention of the non-microbiological processes, sulfiting agents have proven to be quite successful. However, this success has, in several instances, been attained at great cost. It is been found that a small part of the population may encounter serious reactions to products that have been processed using sulfiting agents. In some cases, this reaction has caused the death of consumers. Hightened consumer awareness of the danger of sulfites has lead to numerous complaints to the Food and Drug Administration (FDA) and is best illustrated by current writings found in both the media and semi-professional journals.

In TIME, Oct. 14, 1985, Anastasia Toufexis wrote: "An additional 850 people have reported allergy-like reactions to the chemicals, 80% after eating sulfite-laced fruits and vegetables at salad bars and restaurants. This Fall, after almost three years of study, the Food and Drug Administration will impose a ban on the use of six sulfite preservatives in fresh produce." And, further in the article she writes: "To safeguard the public, the Center for Science is urging an outright ban on all use of sulfites. But others note that very few ill effects are documented from sulfites in packaged foods and that there is no substitute for them in making wine. Of the 12 sulfite-associated deaths, only one was caused by wine, one by beer and one by hash brown potatoes. The rest were all linked to fresh fruits or vegetables." And, ". . . and they should not go to salad bars, at least until the ban goes into effect (emphasis added)".

Less than two months later, reporting for the FDA Consumer, December 1985-January 1986, in an article entitled *Reacting to Sulfites*, Chris Lecos, a member of FDA'S public affairs staff, stated: "Over the last three and one half years there has been extensive publicity and controversy surrounding the wide spread use of sulfiting agents in the food supply. The controversy stems from sulfites' potential for triggering moderate to severe adverse reactions, including death, in certain sulfite-sensitive individuals. (However, sulfites are not considered hazards to the general population)." Writer Lecos further informs us that "Sulfiting agents are primarily used to reduce or prevent spoilage and discoloration during the preparation, storage and distribution of many foods. They are used in many packaged potato products to preserve the vegetable's white appearance." And, ". . . FASEB recommended regulatory action by FDA on the use of sulfites on fresh fruits and vegetables and pre-cut potatoes." Finally, the public is advised that "FDA is not expected to take final action on the two proposals until 1986. Both proposals triggered a substantial response from industry, consumer groups and others, and neither will go into effect until after FDA reviews the comments received and publishes a final regulation. FDA also is considering a regulation dealing with a widespread use of sulfites in processed potato products (applicant emphasis added). Even with the adoption of the two proposed regulations, sulfite-sensitive consumers would still have to be alert to the possible presence of sulfites in the foods they eat at home or in restaurants. Food served in restaurants generally are not packaged and therefore are not labeled. Most packaged potato products (applicant emphasis added) used by restaurants, for example, are treated with sulfites, as are other canned products used in cooking. Generally, foods and beverages that sulfite-sensitive consumers should be alert to are salads, potatoes (applicant emphasis added), seafood, cooked vegetable dishes, wine, beer, and bakery products."

Applicant-inventors are particularly concerned with the preservation of fresh peeled whole potatoes. In a recent New York State Industries for the Handicapped (NYSIH)-funded project report, produced by the Food Research Institute (University of Wisconsin-Madison) and dated Sept. 25, 1985, the Executive Director for NYSIH was advised that, relative to the processing of peeled potatoes "Sulfite solutions were the only effective dipping solutions to prevent browning."

The inventors, paying heed to the prospective FDA ban of sulfites, have, for the past few years, been experimenting with possible alternatives to the use of sulfites. During the preparation of whole peeled potatoes, it is necessary to impede the discoloration process immediately after peeling. It has been determined that an immediate dip in a discoloration retarding solution, whether using sulfites or alternatives, is necessary. A 20-30 minute period is allowed for finished trimming of the potatoes to remove parts which are considered to be unappetizing or adulterated. Immediately upon termination of the trimming period, the potatoes are subjected to a second dip and, thereafter, removed for packaging and refrigeration. With this general method, sulfiting of fresh whole peeled potatoes results in satisfactory shelf lives (at 8° C.) for up to ten days. It was therefore our experimental goal, should a sulfite substitute be found, to develop a composition and process that would equal or exceed the sulfite-produced shelf life.

Thus it is the principal object of this invention to provide a new and improved compound or combination of compounds which may be used as an alternative to the use of sulfites as inhibitors of discoloration in foods.

Another object of this invention is to provide the aforementioned compounds in a form readily applicable to fresh peeled vegetables, leafy vegetables and fresh peeled fruits.

It is yet another object of this invention to develop and provide a method of application of the sulfite alternative to fresh fruits and vegetables.

Objects and advantages of this invention are set forth in part herein and in part will be obvious through practice with the invention.

SUMMARY OF THE INVENTION

It has been found that the objects of this invention may be realized by preparation of a solution comprised of 100 parts by weight of water, 0.5-2 parts by weight of citric acid and 0.5-2 parts by weight of acidic sodium meta/ultra-phosphate of an atypically acidic (glassy) sodium polyphosphate group, here generally defined as atypically acidic metaphosphates or ultraphosphates, and substituting this solution for the sulfite solution of the current processes described in the aforementioned Background of the Invention. During the investigation for chemicals to control non-enzymatic browning, the phosphate compounds were tried extensively. A suitable mixture of the above named acidic poly-(or meta-/ultra-phosphate) compounds was found in the commercial preparation SPORIX (TM). SPORIX compound is distributed by International Sourcing Inc. and can be characterized as acid sodium metaphosphate or, as described by the USDA, sodium polyphosphate having an atypical acidic pH, that is, it is an acid ultraphosphate compound and upon visual inspection reveals that it is of the class of phosphates comprising glassy compounds or products. Thus, it is not incorrect to describe SPORIX compound, the main constituent of this invention as (groupwise) an acidic glassy sodium polyphosphate nor to classify it as acid sodium metaphosphate/ultraphosphate. What is paramount in the composition is that a greater percentage of the phosphate ion is obtained vis-a-vis the normal alkaline character of a sodium phosphate; and, the SPORIX compound displays an unusual (atypical) acidic character. Such a unique combination is within the skill of experts, as the existence of SPORIX compound will attest. Notwithstanding a lack of teaching on how such a compound is made, the instant inventors have succeeded in discovering a most noteworthy improvement to its use; a discovery not made by the inventor of the compound, nor suggested anywhere. Actual usuage of SPORIX compound because of its low solubility in cold water, involves uncomplicated techniques using either the mixture pre-dissolved in water or the mixing of small amounts of it in relatively large volumes of water. It should be understood that the foregoing general description and the following detailed description are exemplary and explanatory of the invention but should not be viewed as restrictions. Thus, while the instant dipping solution composition and its method for application are applied specifically to the extension of shelf life for whole peeled potatoes, it should be viewed, in its most general sense, as an alternative to the use of sulfites in the preservation of fresh peeled fruit, and fresh leafy and peeled vegetables. It may be used for the extension of useful shelf lives for such commodities as fresh lettuce and spinach, fresh root and tuber vegetables such as yams, carrots, and beets; and, the acidic ultra/metaphosphate or polyphosphate composition of, preferrably, sodium in non-aqueous form may be used in the preservation, and extension of useful shelf lives, of dry packaged products easily achieved because a mixture (dry) of citric acid with SPORIX is a logical extension of the first mixture (solution). Likewise, as practice with the invention should reveal, use of a compound such as SPORIX compound as representative of the group of polyphosphates that are atypically acidic, with other sequestrants (such as citric acid), and compounds may also be used without departing from the principles and advantages of this invention.

DESCRIPTION OF THE PREFERRED EMBODIMENT

The phosphate compounds are proven effective chemicals to control non-enzymatic browning reactions in potatoes. However, in potato processing operations, the control of enzymatic browning is also of concern. In order to control enzymatic as well as non-enzymatic browning, the inventors use a blend of acidic sodium metaphosphate, a glassy polyphosphate as exemplified by SPORIX compound, with a sequestrant, (a substance for chelation), in this case citric acid. Current industrial processing employs alternative packing methods such as vacuum packing, in addition to the use of several sequestrants and antimicrobial compounds (such as sodium citrate, lactic acid, and sodium benzoate).

The inventors have discovered that a SPORIX compound-citric acid combination, used alone as a substitute for the current processing, is more effective.

The following formula and process for its application comprise the preferred embodiment and allow achievement of the invention's objectives:

Chemical formula: SPORIX compound 1.08 parts by weight; citric acid, 1.08 parts by weight; and water, 100 parts, by weight.

Initial dip: 30 seconds

Final dip: 120 seconds

Packaging: regular bag comprised of polyethylene

Observations: Shelf life based on a normal color of the product (whole peeled potatoes) in the packaging is 12 days. When the bag is opened, an acceptable fragrance is noted. After the bag is opened, potatoes are observed to hold their normal color, in open air, for seven hours. Cooking by steam is completed in 35 minutes, longer than normal because the outer surface of the potatoes is somewhat harder than normal (possibly due to a reaction of pectic substance with citric acid, hyper-activated by heat). After cooking, it is noted that normal color is retained after additional exposure to air for up to 5 hours. Consumption of the product, immediately after cooking, by an impartial panel of individuals indicates that the taste is readily acceptable to 55% with 10% reporting a fair taste and 33% reporting an acidic, but palatable, taste. The same percentage of those indicating fair to acceptable taste also reports acceptable texture. The appearance of cooked potatoes, like the precooked specimen, is rated as good.

In order to improve flavor and texture, the inventors suggest that sodium citrate be added to the dip treatment. Likewise, an antimicrobial agent, such as sodium benzoate, should also be included in the dip solution.

Thus, the successful method of application of the chemical formula disclosed above contemplates first peeling the fresh potatoes by a suitable method (hand peeling being the preferred), immediately subjecting the peeled vegetables to a dip of 30 seconds, removal and trimming for approximately 20 minutes, final subjection to dip solution for 120 seconds, removal, draining and packaging in polyethylene bags and storage under refrigeration approximately 32°–40° F.

Application of the preferred method is extended readily to leafy vegetables, notably lettuce and cabbage, in the following manner:

Chemical formula: SPORIX compound 1 part by weight; citric acid, 1 part by weight; and water, 200 parts by weight (Solution: 0.5% SPORIX compound 0.5% citric acid)

Sole dip: 1 minute

Packaging: polyethylene bag; no vacuum

Observations: After storage at refrigeration temperature (35–40 degrees F./2–5 degrees C.), chopped lettuce maintains normal shelf life and marketable quality, in terms of normal color, texture, taste and flavor for 7 days; chopped cabbage retains marketable quality for 9 days.

The SPORIX compound-citric acid combination is more dilute for leafy vegetables than potatoes. Moreover, leafy vegetables require a singular dip, which may be realized as a spraying, for only a one (1) minute contact with the solution.

The processing of lettuce and cabbage is conducted by initial cleaning and coring followed by chopping or rendering the leaf susceptible to tincturing with SPORIX compound-citric acid solution. Contact with the solution is preceded by a dip in 0.6% chlorinated water and one (1) minute rinse in tap water. After the one (1) minute contact with the solution, leaves are drained, packaged and refrigerated (stored).

The invention in its broader aspects is not limited to the specific embodiment described herein but may be practiced by those knowledgeable in the art without departing from the scope of the accompanying claims nor sacrificing its chief advantages.

What is claimed:

1. A solution for use in the process of preserving leafy vegetables and fresh-peeled fruits and vegetables comprising aqueous citric acid and an acidic polyphosphate compound dissolved therein.

2. The invention of claim 1 wherein said aqueous citric acid further comprises 0.5–2 parts by weight citric acid and 100 parts by weight water.

3. The invention of claim 2 wherein said acidic polyphosphate comprises a glassy compound from the class of acid meta-or ultra-phosphates.

4. The invention of claim 3 wherein said acidicpolyphosphate in the amount of 0.5–2 parts by weight is dissolved in said citric acid.

5. A process for preserving fresh peeled fruits/vegetables from oxidation and discoloration comprising: dipping said fruits/vegetables in the solution described in claim 1, removing from said solution and storing said fruits/vegetables.

6. The method of claim 5 as applied to peeled fruits and vegetables wherein said dipping further comprises the steps of: dipping for a first discrete period to inhibit immediate oxidation and discoloration and removing from said solution in order to trim said fruits/vegetables; and dipping for a second discrete period to additionally expose first-dipped and trimmed surfaces of said fruits and vegetables to said solution.

7. A process of claim 5 wherein storing further comprises packaging said fruits and vegetables and refrigerating them at 0–5 degrees Celsius.

8. A process for preserving fresh leafy vegetables from oxidation and discoloration comprising: exposing the surfaces of said vegetables to the solution described in claim 1 and drawing and storing said vegetables at 0–5 degrees Celsius.

9. The process of claim 8 wherein said exposing further comprises spraying vegetable leaves until all surfaces are covered for one minute.

10. A dry mixture to be used in food preservation and comprising non-aqueous citric acid and acid sodium polyphosphate.

* * * * *